3,337,362
TEXTILES TREATED WITH METHYLOL AMIDES OF AN ADDUCT FORMED BETWEEN A MALEYL COMPOUND AND ETHYLENICALLY UNSATURATED ALIPHATIC COMPOUND
George W. Cogswell, Decatur, Ill., and Roy H. Boggs, Greenville, S.C., assignors to A. E. Staley Manufacturing Company, Decatur, Ill., a corporation of Delaware
No Drawing. Filed June 20, 1963, Ser. No. 289,387
12 Claims. (Cl. 117—76)

This invention relates to a new water-repellent treatment for textiles. More particularly this invention relates to a process of impregnating textiles with an aqueous solution of a methylol amide of an adduct formed between a maleyl compound and an ethylenically unsaturated fatty acid ester of a polyhydric alcohol, and then heat-setting said reaction product.

Textiles have been made water-repellent by application of waxy substances, such as hydrocarbons and long chain fatty acids or derivatives thereof applied from solutions or dispersions. The major problems have been to choose the best materials, and to formulate and apply them so that the water-repellent finish is not removed by service and cleaning. In trying to solve these problems numerous treatments have been devised, but they generally have one or more of the following shortcomings: (1) the use of inflammable organic solvents is required, (2) the fibers are damaged by some of the chemicals or heat treatments, (3) the treatment is applicable to only one or, at best, a few types of textiles, (4) the process of application is complex, (5) the water-repellent effect is lost or seriously diminished by laundering or dry cleaning, or (6) the treatment is quite expensive.

The object of this invention is to provide a simple, inexpensive process for treating textiles to make them water-repellent. A further object is to provide water-repellent textiles, in which the water-repellent effect is resistant to laundering, dry cleaning and normal wear.

We have now found that the objects of this invention can be attained by using aqueous solutions of thermosetting methylol amides of adducts formed between alpha, beta-ethylenically unsaturated dicarboxy compounds (maleyl compounds) and polyhydric alcohol esters of ethylenically unsaturated fatty acids having a chain of from 10 to 24 carbon atoms, wherein said adduct contains on an average at least 4 potentially reactive carboxy groups per molecule. This is surprising since thermosetting finishes on textiles normally decrease the tensile strength, tear resistance and resistance to penetration by water of the fabric. However, the methylol amides of this invention increase each of these properties.

As explained in detail in commonly assigned application Ser. No. 264,069, filed Mar. 11, 1963, these methylol amide adducts can be prepared by (1) reacting an adduct formed between an alpha, beta-ethylenically unsaturated dicarboxy compound (maleyl compound) and polyhydric alcohol ester, with a basic nitrogen compound, which contains at least two active hydrogen atoms bonded to the same or different nitrogen atoms in the same molecule, and (2) reacting an aqueous solution of the product of step 2 with a formaldehyde source.

In the description that follows, the words "dispersing" and "dispersion" are used in a generic sense to be inclusive of the words "suspending," "dissolving," "suspension" and "solution." The words "ammonia" and "ammonium hydroxide" are used interchangeably. The term "formaldehyde" is used in a generic sense to be inclusive of monomeric formaldehyde and formaldehyde-generating materials. The term "potentially reactive carboxy groups" includes the following groups: the amide group, methylol amide group, the anhydride group, the free carboxylic acid group, and the carboxylic acid salt group.

The readily available naturally occurring glyceride oils, such as soybean oil, corn oil, cottonseed oil, linseed oil, hempseed oil, tung oil, peanut oil, safflower oil, tobacco seed oil, cod oil, herring (or menhaden) oil, dehydrated castor oil, etc., are the preferred esters because of their low cost and relatively large number of ethylenic double bonds available as sites for adduct formation. Other useful, though more expensive esters include linoleic acid esters of trimethylol propane, tall oil fatty acid esters of pentaerythritol, etc. In general, those esters having on an average at least two and preferably three to nine non-conjugated ethylenically unsaturated groups per molecule are suitable. These can be thought of as being esters of a polyhydric alcohol (e.g. ethylene glycol, glycerol, trimethylol ethane, sorbitol, inositol, etc.) having from 2 to 6 hydroxyl groups with ethylenically unsaturated fatty acids of from 10 to 24 carbon atoms.

The maleyl compound (alpha, beta-ethylenically unsaturated dicarboxy compound) can be maleic anhydride, maleic acid, fumaric acid, dimethyl maleate, monomethyl hydrogen maleate, mono-2-ethylhexyl hydrogen maleate, citraconic acid, citraconic anhydride, itaconic acid, itaconic anhydride, ethyl maleic acid, maleimide, maleamic acid, etc. Of these, maleic anhydride is preferred because of (1) its low cost, (2) the ease with which it forms adducts in almost quantitative yields and (3) the high concentration of amide groups which result from the reaction of the anhydride adduct with a basic nitrogen compound. While maleic acid, which forms the anhydride under the conditions of adduct formation has most of the advantages of maleic anhydride, it is twice as expensive as the anhydride. Fumaric acid, which approaches the cost of maleic anhydride on a weight basis, requires considerably more severe reaction conditions to form an adduct and, even then, the yield is lower. Further, adducts prepared from free dicarboxylic acids that are not capable of forming an anhydride under the conditions of the maleation reaction and from half-esters and diesters produce amides with a lower concentration of amide groups after treatment with a suitable basic nitrogen compound than corresponding adducts containing the same concentration of carboxy groups in the anhydride form. It goes without saying that diesters are only suitable in this invention when at least some of the carboxy groups in the diester adduct are saponified during or before the addition of the basic nitrogen compound to permit amide formaton. Citric acid and malic acid which forms alpha, beta-ethylenically unsaturated dicarboxy compounds under the conditions of the maleation reaction can also be used in this invention.

Ammonia, which can be employed as gaseous ammonia or in the aqueous ammonium hydroxide form, is the preferred basic nitrogen compound because of its low cost, availability, high vapor pressure in water, the ease with which it forms amides and the ease with which its amides form methylol groups. Various primary amines; such as methyl amine, ethyl amine, and butyl amine; primary and secondary polyamines; such as ethylene diamine, diethylene triamine, propylene diamine and N,N'-dimethyl-ethylene diamine; can be used to partially or completely replace ammonia. All of these amines contain at least two active hydrogen atoms which may be bonded to the same or to different nitrogen atoms in the same molecule.

Formaldehyde, generally as formalin, is the preferred source of formaldehyde. Polymeric forms of formaldehyde, such as trioxane and paraformaldehyde, are decidedly inferior to formaldehyde. These polymeric forms must be employed at much higher temperatures than the monomeric formaldehyde. Of course, the polymeric form is equivalent to the monomeric form if it is first converted to the monomeric form before reaction with the amide adducts. Reaction products of formaldehyde with basic nitrogen compounds of the preceding paragraph, such as hexamethylene tetramine, are decidedly poorer than the individual reactants. Even in those cases where ammonia has been employed to form the amide prior to the addition of hexamethylene tetramine, higher temperatures must be employed to form the desired methylol amide than when monomeric formaldehyde is used. Further, the detergent resistance of fabrics treated with formaldehyde condensation products are inferior to the detergent resistance of fabrics prepared by the preferred route.

In somewhat greater detail, the adduct is formed by reacting the long chain ethylenically unsaturated fatty acid ester and the maleyl compound at a temperature of about 150° C. to 300° C. in an open vessel or under pressure in an autoclave. While maleic anhydride forms an adduct in almost quantitative yields in an open vessel, other maleyl compounds, such as dibutyl maleate, give considerably better yields when the reaction is carried out under pressure.

The ratio of maleyl compound to ester in the reaction vessel can range from about 0.25 to 2 moles or more of maleyl compound per equivalent of unsaturation in the long chain fatty compound, depending upon the choice of reactants and the desired properties of the products. For example, the preferred naturally occurring glyceride oils, such as soybean oil or linseed oil, can be reacted with from about 20% to 45% by weight of maleic anhydride to form adducts containing from about 2.0 to 4.5 maleic anhydride moieties per molecule of glyceride oil. (The resulting maleic anhydride portion of the glyceride oil adduct comprises from about 18% to 33% by weight of the product.)

The maleated ester can be converted to the amide by a variety of techniques. For example, an anhydride adduct, such as that resulting from the maleation of a naturally occurring glyceride oil with maleic anhydride or maleic acid, can be converted to the amide form in any of the following ways: (1) stirring the anhydride adduct in an atmosphere of ammonia until the exothermic reaction ceases, (2) adding concentrated aqueous ammonium hydroxide (28% aqueous solution, for example) to the anhydride adduct and stirring until the adduct disperses, (3) adding the anhydride adduct to concentrated aqueous ammonium hydroxide and stirring until the adduct disperses, (4) mixing the anhydride adduct with a calculated amount of water and then bubbling a sufficient amount of ammonia gas into the system to disperse the anhydride adduct, (5) mixing the anhydride adduct with a calculated amount of water, opening the anhydride ring by heating and then adding ammonia gas or aqueous ammonium hydroxide to disperse the adduct.

As explained in detail in application Ser. No. 264,069, the percentage of potentially reactive carboxy groups, which are converted to amide groups, can be readily controlled. The amide groups can typically comprise from about 7.5% to about 42.5% of the potentially reactive carboxy groups. In general, it is preferred that at least one molecule of ammonia be added per each anhydride group (i.e. ½ mole of ammonia per each potentially reactive carboxy group) in the adduct in order to prepare adducts, wherein at least 15% of the potentially reactive carboxy groups are amide groups. The higher the concentration of amide groups, the better the water-repellency of the treated fabric.

The amide adduct, which has preferably been dispersed in water, is then reacted with formaldehyde or a compound capable of generating formaldehyde, preferably by adding the formaldehyde source (usually formalin or paraformaldehyde depolymerized to the monomeric form) to the amide adduct or by adding the amide adduct to the formaldehyde source. This reaction can be carried out in a sealed vessel or in an open vessel. Generally, it is preferred to carry out this reaction at a moderate temperature (5° C. to 75° C.) in an open vessel. A sufficient concentration of formaldehyde is added in this step to provide at least 0.7 mole of formaldehyde per each equivalent of nitrogen containing compound bearing a nitrogen atom bonded directly to hydrogen (each NH group) in the aqueous composition.

Excellent results have been obtained by adding at least about 0.8 mole of formaldehyde for each mole of basic nitrogen containing compound, which contains two hydrogen atoms bonded directly to nitrogen, used to form the amide. In this way essentially all the ammonium ions, etc. in the reaction medium are converted to non-volatile nitrogen and the methylol amide adduct is precipitated from the aqueous reaction medium as a water-insoluble hydrate. This frequently has a dough-like consistency. The formation of this precipitate is visual evidence that a sufficient concentration of formaldehyde has been added to the amide adduct.

If less than 0.7 mole of formaldehyde per each equivalent of nitrogen-containing compound bearing an NH group is added to the aqueous amide, the methylol amide, by itself, does not impart the desired degree of water-repellency to the fabric. However, such materials as well as the preferred methylol amides can be used as low cost extenders for various water-repellent agents, such as aqueous dispersions of polytrifluorochloroethylene, Scotchgard and polytetrafluoroethylene.

After the formaldehyde reaction, the resultant methylol amide is neutralized or made basic by the addition of a suitable basic material, preferably ammonium hydroxide or a volatile amine. Any precipitated amide is thereby redispensed.

Non-volatile alkali is not preferred since water-repellent fabrics based thereon have poorer water resistance and detergent resistance. Diamines, such as ethylene diamine, are advantageously employed with ammonia in order to give the cured products a somewhat softer, more flexible character. Further, ethylene diamine acts as a wetting agent for the methylol amide in the treatment of viscose, cotton or other hydrophilic fabrics. The ethylene diamine is preferably used in a concentration of from about 0.05 to 0.25 mole per mole of maleyl compound in said methylol amide.

The methylol amides of this invention are preferably applied to the textile fabric by simply dipping the fabric into an aqueous dispersion of the methylol amide. Best results are obtained with aqueous dispersions having a methylol amide concentration of from about 2.5% to 15% by weight, although concentrations of from 1% to 40% can be used. The best solids concentration is determined by how much polymerized methylol amdie is desired on the fabric and how many impregnations can be employed to deposit this amount of polymer. For maximum economy it is desirable to employ only one impregnation and to deposit the minimum amount of methylol amide necessary to get the desired water-repellency. Usually when one impregnation is employed, the increase in weight of the fabric approaches the concentration of bath, i.e. a fabric passed through a 3% bath of methylol amide will have close to a 3% increase in dry weight.

After the fabric is dipped into the aqueous dispersion, the fabric is wrung out, usually by passing through a mangle, in order to remove excess dispersion. The methylol amide is then cured by heating the fabric to a temperature of about 110° C. to 350° C. Generally, it is preferred to first dry the fabric at about 100° C. to 135° C. and then cure the methylol amide at 140° C. to 170° C. for about 1 to 6 minutes.

A catalyst, such as melamine dissolved in formalin, hexamethylene tetramine, ammonium p-toluene sulfonate, ammonium vanadate, ammonium molybdate, zinc fluoroborate, zirconium ammonium acetate, zinc ammonium acetate, etc., can be used to speed up the cure or permit the use of curing temperatures as low as 120° C. In the absence of a catalyst, the rate of cure is impractically slow for commercial operation at temperatures much below 140° C. The catalyst can be used in a concentration up to 5% by weight of the methylol amide. Preferably the metal salts are employed at a concentration of about 0.5% to 1.5% by weight of the methylol amide.

If desired, the water-repellent fabric can be rendered still more water-repellent and oil-repellent by treatment with a fluorocarbon such as those sold under the name Scotchgard. In this treatment the cured methylol amide water-repellent coating serves as an excellent primer for the fluorocarbon treating agent. The methylol amide treatment also permits the use of lower concentrations of the expensive fluorocarbon than normally employed without the loss of any of the beneficial properties of this treatment. In effect the methylol amide precoat functions as a low cost extender of the expensive fluorocarbon.

A number of the fluorocarbon compounds disclosed in U.S. Patent 2,937,098 to Geen can be used. A particularly efficacious compound is perfluorooctane sulfonyl glycine.

In a typical commercial operation the methylol amide treated fabric is run through a bath of one of the fluorocarbons. The fabric is then partially dried by running the fabric through nip rolls. The fluorocarbon is preferably heat set by maintaining the fabric at from 140° to 170° C. for about 1.5 to 3 minutes. Temperatures as low as 100° C. can be employed if a longer curing time is used. Preferably, the fluorocarbon comprises from about 0.2% to 1.5% by weight of the treating bath. If desired, the fluorocarbon can be used in a concentration as low as 0.1% by weight of the treating bath. Concentrations higher than about 2% by weight of the treating bath are not economically attractive.

The fabrics used in this invention can be woven or of a non-woven type. These fabrics can be formed from one or more types of yarn, staple fiber or filament. Suitable fibers include wool, linen, silk, jute, sisal, ramie, hemp, cotton, viscose rayon, cellulose acetate, vinyl resin fibers such as those of polyvinyl chloride, copolymers of vinyl chloride with vinyl acetate, vinylidene chloride or acrylonitrile containing a major proportion of vinyl chloride in the polymer molecule, homopolymeric acrylonitrile and copolymers of acrylonitrile with vinyl chloride, vinyl acetate, methacrylonitrile, vinyl pyridine, or with mixtures of such comonomers containing at least 75% acrylonitrile in the copolymer molecule, polyamides of the nylon type such as hexamethylene adipamide, polyesters such as polyethylene terephthalate, etc. The individual yarns can also be mixtures of one or more of the above fibers.

The following examples are merely illustrative and should not be construed as limiting the scope of the invention.

EXAMPLE I

A 60% active aqueous solution of a methylol amide having on an average 6 potentially reactive carboxy groups per molecule was prepared in the following manner:

Eight hundred and eighty-four grams of bleached soybean oil (1 mole) was heated to 230° C. in a three-necked flask equipped with a stirrer, reflux condenser and addition port. After 294 grams (3 moles) of liquid maleic anhydride was added through the addition port over a period of one and one-half hours, the composition was heated to 250° C. and held there for 15 minutes. The maleated oil, cooled to about 50° C., was then added to 700 grams of aqueous ammonium hydroxide (6 moles ammonia) while maintaining the reactants at between 25–50° C., thereby dissolving the maleated oil. By distilling off ammonia from a slightly basic sample of the solution it was determined that about 42.5% of the potentially reactive carboxy groups (85% of the starting anhydride groups) had been converted to the amide form. Five hundred and fifteen grams of formalin (6.3 moles formaldehyde) were added rapidly to the solution and the pH of the aqueous system dropped to about 5 to 5.5 precipitating the methylol amide as a water-insoluble hydrate. The water-insoluble hydrate was redissolved by slowly adding 143 grams of aqueous ammonium hydroxide (2.1 moles ammonia) while maintaining the exothermic reaction at about 50° C. The solution had a pH of about 7. Then 21.2 grams ethylene diamine (0.35 mole) and 52.0 grams aqueous ammonium hydroxide (0.77 mole ammonia) were added to adjust the pH of the aqueous solution of methylol amide to a pH of 7.5–8.5. The final product was approximately 60% active material.

The above 60% active material was diluted down to 3% active material by adding 19 parts by weight water per each part by weight of the 60% active aqueous solution of the methylol amide. The 3% active solution was placed in a padder and a roll of 4-ounce-per-year cotton fabric was passed through the padder and then through the nips of two rolls. The partially dry fabric was then passed through a 90′ long tenter frame through a Proctor-Schwartz drier, which was maintained at 115–135° C., and a festoon-type curing oven, which was maintained at about 165° C. The cotton fabric had a weight gain of about 2%. A swatch of material had excellent water-repellency which it retained after five washings with detergent.

EXAMPLE II

Example I was repeated using an enzyme desized denim fabric and a 12% active aqueous solution of methylol amide. The denim fabric had a weight gain of about 10% after being air dried at room temperature for 24 hours and cured 2 minutes at 150° C.

The resistance to penetration by water (hydrostatic head values) of the methylol amide finished fabric and an unfinished fabric were measured according to A.A.T.C.C. Test Method 18–1961. The methylol amide-finished fabric supported 14 ml. more water than the untreated fabric.

The tear resistance of the methylol amide-treated fabric and an untreated fabric was measured according to Federal Specifications, Textile Test Method No. 5134, "Tearing Strength of Cloth; Tongue Method." The tear strength of the treated cloth was 12 pounds higher than the untreated cloth.

The tensile strength of the methylol amide finished cloth was over 4 pounds higher than the tensile strength of the unfinished material, as measured according to Federal Specifications, Textile Test Method No. 5100; "Breaking Strength and Elongation of Woven Cloth; Grab Method."

EXAMPLE III

Example II was repeated using a canvas fabric of awning type. The awning supported a hydrostatic head of 40 mls.

EXAMPLE IV

Example I was repeated using a cotton poplin fabric and a 12% active aqueous solution of methylol amide. The impregnated fabric was next passed from the festoon-type curing oven through an aqueous bath containing 2% by weight of a 28% by weight active fluorocarbon Scotchgard FC208 which is believed to be perfluorooctane sulfonyl glycine (actual analysis 1.6% sulfur, 0.6% nitrogen; theoretical 1.6% sulfur, 0.7% nitrogen). The aqueous bath contained 0.56% by weight of FC208. The poplin fabric was passed through a mangle and dried at 150° C. for two minutes. The cotton poplin was completely water-repellent and oil-repellent.

Since many embodiments of this invention may be made, and since many changes may be made in the embodiments described, the foregoing is to be interpreted as illustrative only, and our invention is defined by the claims appended hereafter.

We claim:
1. A woven textile fabric impregnated with a water-repellent finish comprising a finishing agent cured to a water-repellent state by heat at a temperature of about 110 to 350° C., wherein said finishing agent in an uncured state comprises a water-soluble methylol amide of an adduct formed by reaction between a maleyl compound and an ester of an ethylenically unsaturated fatty acid of from 10 to 24 carbon atoms with a polyhydric alcohol having from 2 to 6 hydroxyl groups having on an average at least 4 potentially reactive carboxy groups per molecule.

2. The article of claim 1, wherein said maleyl compound comprises a compound selected from the group consisting of maleic acid and maleic anhydride.

3. A woven textile fabric impregnated wtih a water-repellent finish comprising a finishing agent cured to a water-repellent state by heat at a temperature of about 110 to 350° C., wherein said finishing agent in an uncured state comprises a water-soluble methylol amide of a maleated ethylenically unsaturated glyceride oil having on an average at least 4 potentially reactive carboxy groups per molecule.

4. A textile fabric (1) impregnated with a water-repellent finish comprising a finishing agent cured to a water-repellent state at a temperature of about 110 to 350° C., wherein said finishing agent in an uncured state comprises a water-soluble methylol amide of a maleated ethylenically unsaturated glyceride oil having on an average at least 4 potentially reactive carboxy groups per molecule and (2) over coated with a water-repellent, oil-repellent finish which comprises a cured fluorocarbon water-repellent treating agent for textiles.

5. A woven textile fabric impregnated with a water-repellent finish comprising a finishing agent cured to a water-repellent state by heat at a temperature of about 110 to 350° C., wherein said finishing agent in the uncured state comprises a water-soluble product prepared by the steps of (1) reacting a compound containing a basic nitrogen atom with an adduct formed by reaction between a maleyl compound and an ester of an ethylenically unsaturated fatty acid of from 10 to 24 carbon atoms with a polyhydric alcohol having from 2 to 6 hydroxyl groups having on an average at least 4 potentially reactive carboxy groups per molecule, and (2) reacting an aqueous solution of the reaction product of step (1) with formaldehyde.

6. The article of claim 5, wherein said maleyl compound comprises a compound selected from maleic acid and maleic anhydride, and said compound containing a basic nitrogen atom comprises ammonia.

7. The article of claim 6, wherein at least one-half mole of ammonia is added in step (1) per each potentially reactive carboxy group in said adduct and at least 0.7 mole of formaldehyde is added in step (2) per each equivalent of nitrogen compound bearing an NH group.

8. The article of claim 7, wherein said ester of a polyhydric alcohol comprises a glyceride oil.

9. The method of rendering a woven textile fabric water-repellent, which comprises passing said woven textile fabric through an aqueous solution of a methylol amide of an adduct formed by reaction between a maleyl compound and an ester of an ethylenically unsaturated fatty acid of from 10 to 24 carbon atoms with a polyhydric alcohol having from 2 to 6 hydroxyl groups having on an average at least 4 potentially reactive carboxy groups per molecule, and curing said methylol amide at a temperature of about 110 to 350° C. to form a water-repellent finish, wherein said methylol amide comprises from 1 to 40% by weight of said aqueous solution.

10. The method of claim 9, wherein said maleyl compound comprises a compound selected from the group consisting of maleic anhydride and maleic acid.

11. The method of rendering a woven textile fabric water-repellent which comprises passing said woven textile fabric through an aqueous solution of a maleated ethylenically unsaturated glyceride oil having on an average at least 4 potentially reactive carboxy groups per molecule and curing said methylol amide at a temperature of about 110 to 350° C. to form a water-repellent finish, wherein said methylol amide comprises from 1 to 40% by weight of said aqueous solution.

12. The method of rendering a textile fabric water-repellent and oil repellent, which comprises the steps of (1) passing said textile fabric through an aqueous solution of from 1 to 40% by weight of a methylol amide of a maleated ethylenically unsaturated glyceride oil having on an average at least 4 potentially reactive carboxy groups per molecule, (2) curing said methylol amide to a water-repellent state by heating at a temperature of about 110 to 350° C., (3) treating said fabric with a fluorocarbon water-repellent treating agent for textiles and (4) curing said fluorocarbon water-repellent treating agent to form a water-repellent, oil-repellent fabric.

References Cited

UNITED STATES PATENTS

| | | | |
|---|---|---|---|
| 2,188,885 | 1/1940 | Clocker | 260—404 X |
| 2,355,265 | 2/1944 | Bock et al. | 117—161 X |
| 2,637,663 | 5/1953 | Thurston | 117—167 X |
| 2,915,418 | 12/1959 | Wolfson | 117—140 |
| 2,958,613 | 11/1960 | Nelson et al. | 117—121 |

WILLIAM D. MARTIN, *Primary Examiner.*

T. G. DAVIS, *Assistant Examiner.*